May 11, 1954     F. C. KOCH     2,678,201
GAS-LIQUID CONTACTING APPARATUS
Filed July 17, 1950     4 Sheets-Sheet 1

INVENTOR.
Fred C. Koch
BY
Thiess, Olson & Mecklenburger
Attys.

May 11, 1954 F. C. KOCH 2,678,201
GAS-LIQUID CONTACTING APPARATUS
Filed July 17, 1950 4 Sheets-Sheet 2
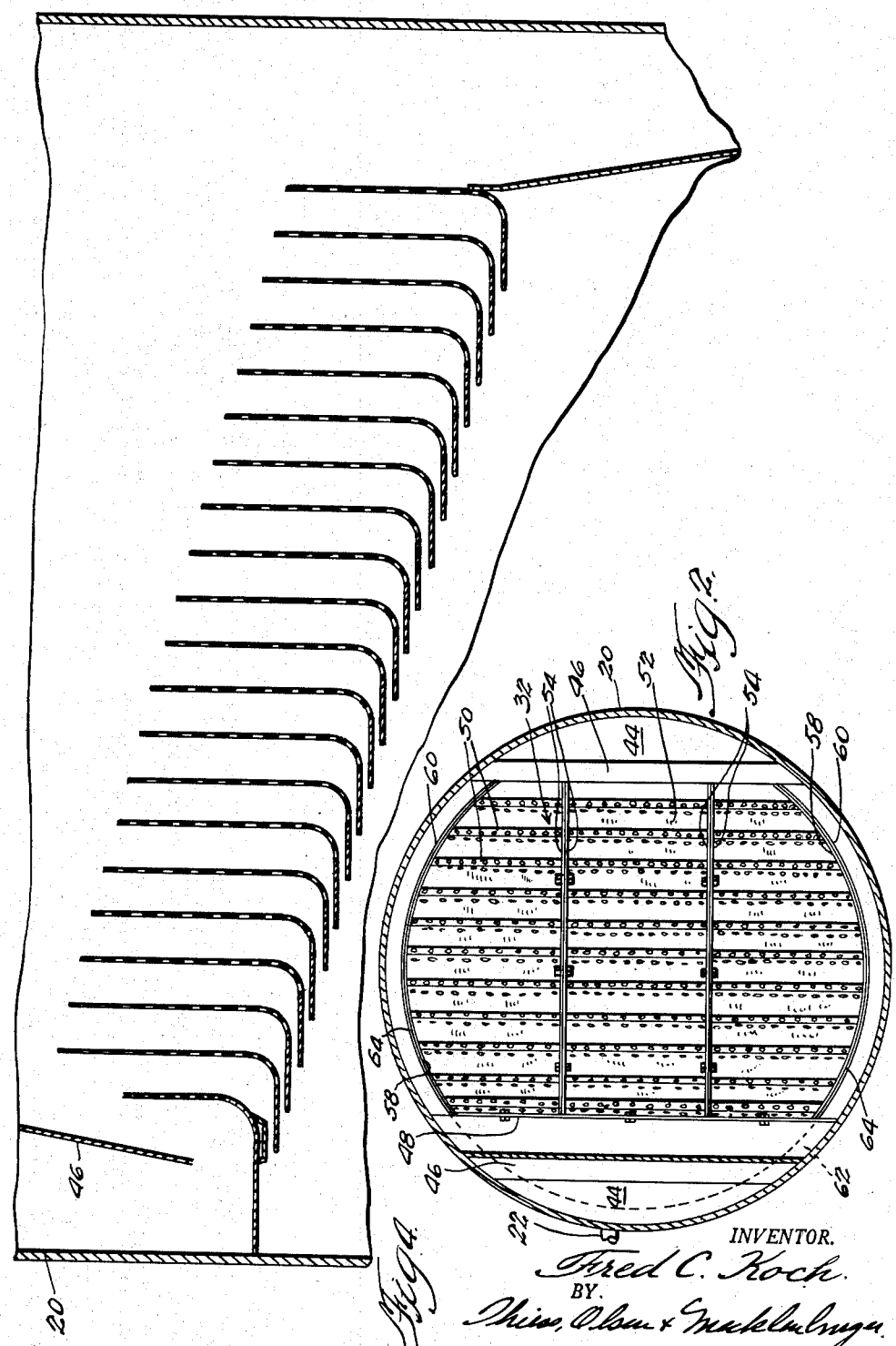
INVENTOR.
Fred C. Koch.
BY
Thiess, Olsen & Mecklenburg
Attys.

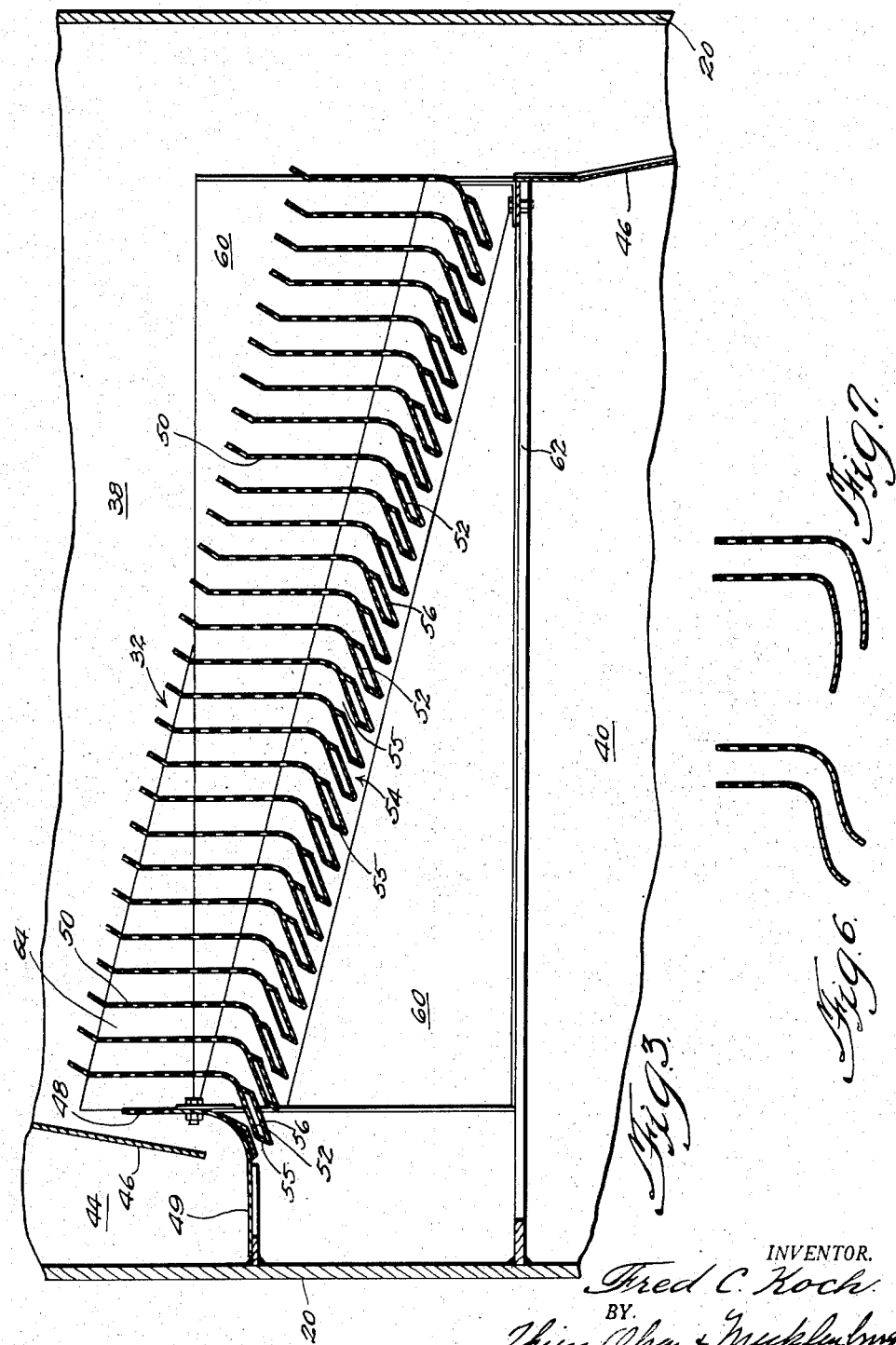

May 11, 1954     F. C. KOCH     2,678,201
GAS-LIQUID CONTACTING APPARATUS
Filed July 17, 1950     4 Sheets-Sheet 4
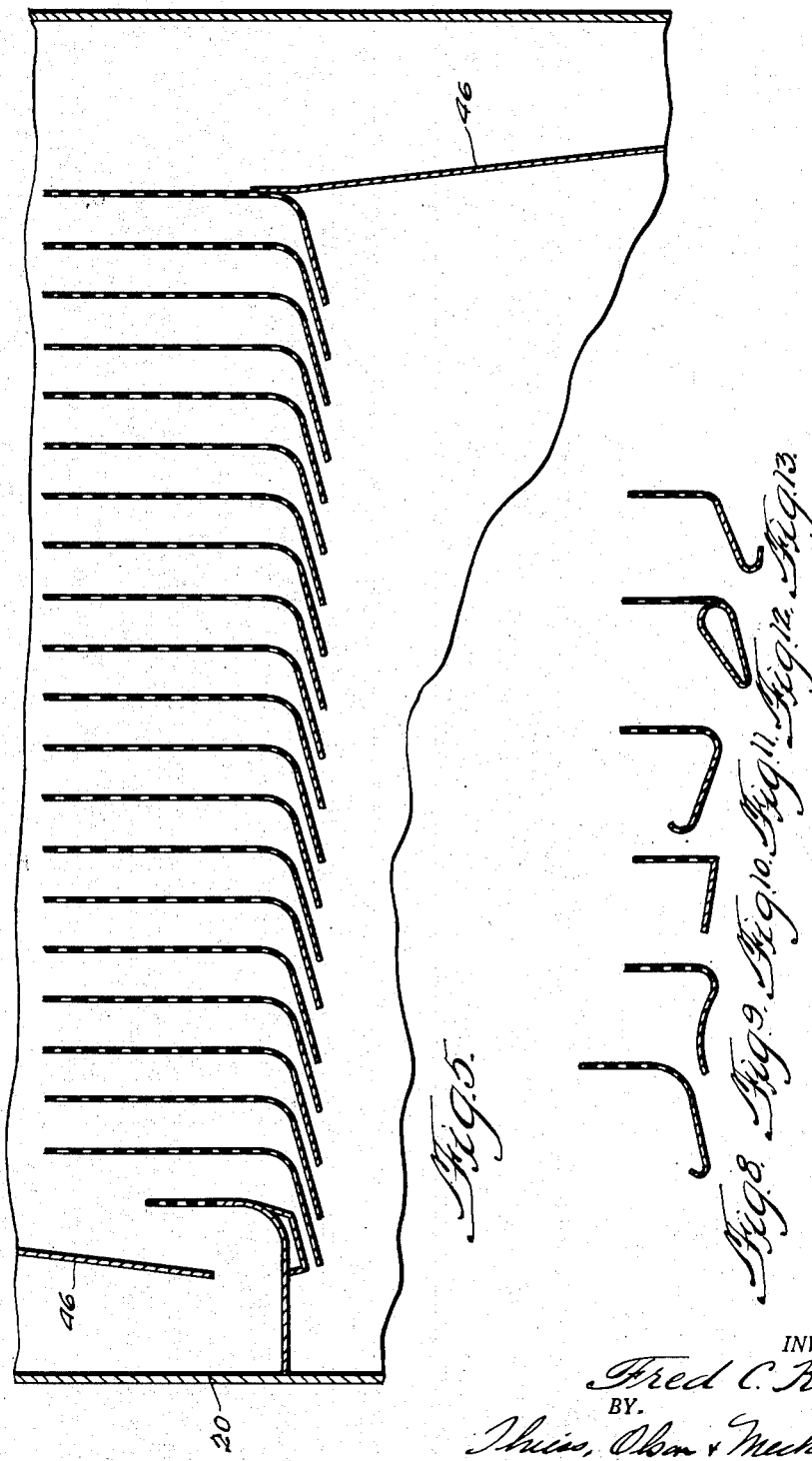
INVENTOR.
Fred C. Koch
BY
Thiss, Olson & Mecklenburger
Attys.

Patented May 11, 1954

2,678,201

UNITED STATES PATENT OFFICE 2,678,201

GAS-LIQUID CONTACTING APPARATUS

Fred C. Koch, Wichita, Kans., assignor to Koch Engineering Company, Inc., Wichita, Kans., a corporation of Kansas Application July 17, 1950, Serial No. 174,146

5 Claims. (Cl. 261—114)

This invention relates to a gas-liquid contacting apparatus and more particularly to an apparatus suitable for use in fractional distillation or dephlegmation.

In the fractionation or dephlegmation of liquids, such as hydrocarbons, it is important that the fractionating column be constructed to provide an intimate mixture between the vapors and liquids passed through the device. It is necessary that intimate mixing occur so that the vapors will thoroughly contact the liquid with no bypassing. It is also desired that the several trays in the dephlegmating or fractionating column be constructed so as to provide a low pressure drop between the several trays and to permit flexibility in the amounts and relative proportions of vapors and liquids.

Accordingly it is an object of this invention to provide a device for contacting liquids and gases in an efficient manner.

A further object of this invention is the provision of a fractionating tower which will efficiently handle extremely large quantities of vapor or gas for a given quantity of liquid.

A still further object of this invention is the provision of a gas-liquid contacting apparatus constructed so that there is a low pressure drop across each of the trays within the device.

A still further object of this invention is the provision of a contact apparatus in which the gases and vapors are thoroughly intermingled and which is so constructed that substantially no by-passing of vapors or liquids can occur.

A still further object of this invention is the provision of a fractionating tray for a contact tower which is simply constructed and which may readily be installed in existing equipment.

Further and additional objects will appear from the following description, the accompanying drawings and the appended claims.

In accordance with one embodiment of this invention, a gas-liquid contacting apparatus is provided which comprises a housing or tower having a tray disposed therein dividing it into lower and upper zones. Means are provided adjacent one side wall of the tower for flowing liquid onto the tray and additional means are provided adjacent the opposite side wall of the tower for discharging the liquid from the tray. Thus a contact tower is provided in which the liquid flows over the tray in such a manner that it traverses substantially the entire cross-sectional area of the tower or housing. In accordance with this invention each tray comprises a plurality of parallel upwardly extending baffle elements extending substantially entirely across the tower in a direction substantially perpendicular to the flow of liquid across the tray. These baffle plates are perforated and have flanges adjacent their lower side edges which extend toward that wall of the housing adjacent the means provided for discharging the liquid onto the upper surface of the tray. The flange elements extend in substantially parallel spaced planes and overlap each other so as to provide a plurality of elongated gas passageways having L-shaped cross sections.

In operation of the device, vapors are passed upwardly through the elongated passageways and liquid is entrained in one passageway by the gas stream, thrown against an adjacent baffle element, passed through the perforations therein, and flowed downwardly for entrainment in the next adjacent passageway. This process is repeated so that the liquid is progressively moved across the tray in much the same manner as disclosed in Patent No. 2,401,569, issued June 4, 1946, to Fred C. Koch. As previously stated, the baffle plates and flanges are arranged to provide a tray which extends substantially entirely across the interior of the housing or tower in substantially a single plane. The tray may be horizontally disposed or slightly inclined to the horizontal if desired.

For a more complete understanding of this invention, reference will now be made to the accompanying drawings, in which Fig. 1 is a broken sectional view of a fractionating tower showing in a schematic manner a number of trays disposed therein constructed in accordance with one embodiment of this invention;

Fig. 2 is a sectional view taken along the line 2'—2' of Fig. 1 and showing more detail with reference to the several tray elements;

Fig. 3 is an enlarged sectional detail view of one of the tray elements shown in Figs. 1 and 2;

Fig. 4 is a partially schematic view of another form of tray constructed in accordance with this invention;

Fig. 5 shows a further modification of a tray constructed in accordance with this invention; and Figs. 6 through 13 further illustrate the various shapes which may be assumed by the flanges on the lower side edges of the several baffle plates in the individual trays.

Figure 1:
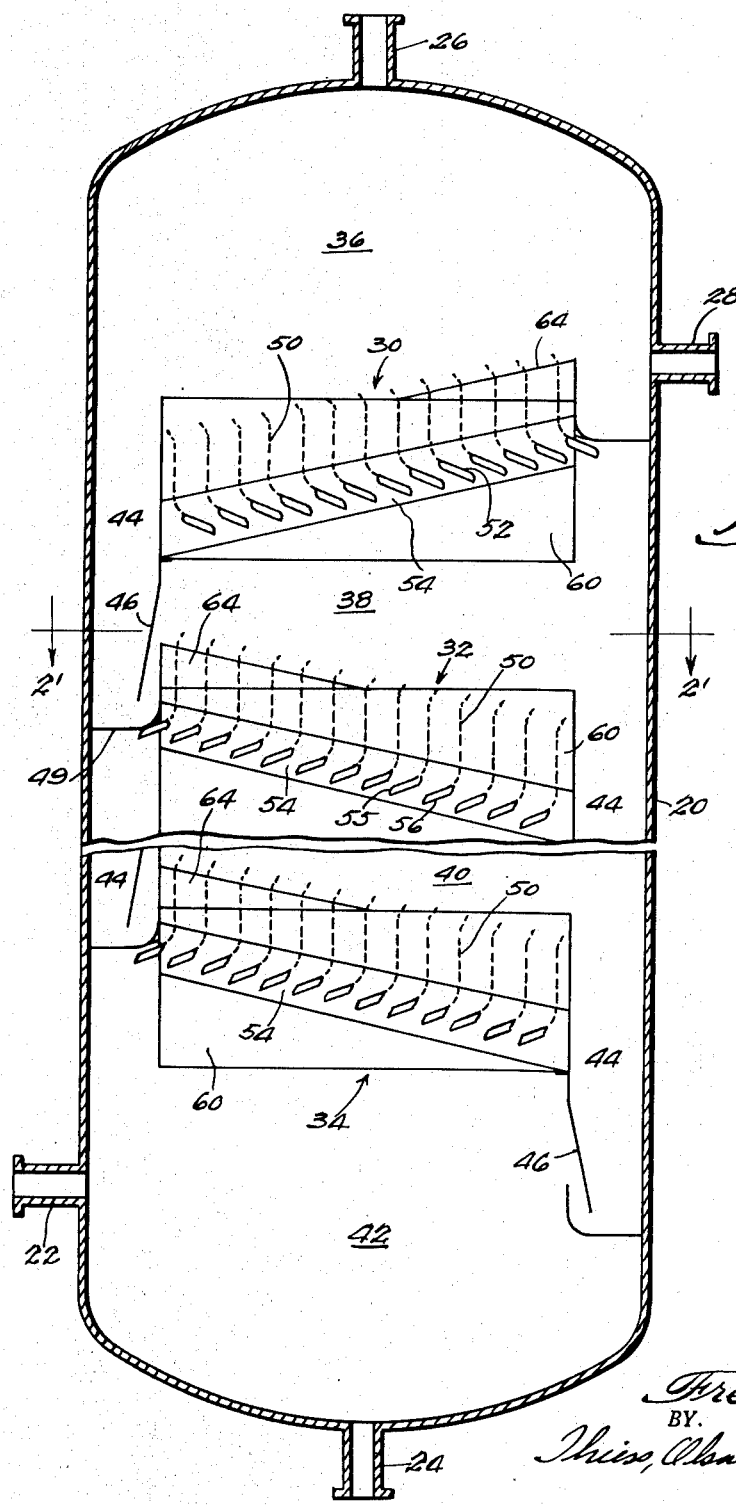

With particular reference to Figs. 1, 2 and 3 showing one form of a device embodying this invention, there is provided a dephlegmating tower or fractionator 20 having the usual vapor inlet 22, liquid draw-off line 26, vapor line 26 and reflux return inlet 28. Within the housing or tower 20 there is disposed a plurality of transversely extending trays 30, 32 and 34. These trays extend substantially entirely across the interior of the tower except for areas adjacent opposite side walls thereof which include means for passing liquid to the trays and means for discharging liquid to a next lower tray. The several trays divide the interior of the housing into a plurality of vertically spaced, substantially cylindrical zones 36, 38, 40 and 42 and the vapors or other gases introduced into the chamber pass upwardly and successively through the several trays and zones for escape through the vapor line 26 in a manner hereinafter to be more fully described.

Suitable downpours 44 are provided adjacent the discharge end of each tray for discharging liquid from that tray to a next tray below. These downpours 44 are defined by the side walls of the housing 20 and suitable baffle plates 46 whereby to provide, in combination with weirs 48, a plurality of liquid sealing chambers adjacent the liquid receiving ends of the next lower trays. The sealing chambers for successive trays are alternately arranged on opposite sides of the tower so that the horizontal direction of flow of liquid reverses upon passage to successive trays. The bottom 49 of each sealing chamber is secured by welding or otherwise to the side wall of the tower 20 and an upward extension of the bottom portion provides the weir 48 which may or may not be perforated in the manner indicated in Fig. 3.

Each of the trays shown in Figs. 1, 2 and 3 comprises a plurality of substantially vertically arranged elongated baffle elements or plates 50 extending substantially completely across the interior of the housing or tower in a direction transversely of the normal flow of liquid across the tray. These baffle plates are each perforated providing a plurality of openings which may be from $\frac{1}{16}$ to 2 inches in diameter. In the modification shown in Figs. 1 to 3 the baffle elements are bent at their tops toward the direction of flow of liquid over the tray. The bottom side edges of the perforated baffle elements 50 are provided with flanges 52 which also extend for substantially the entire width of the tower except in so far as they become discontinuous by reason of supporting plates 54. These flanges 52 are all arranged in substantially parallel spaced planes in overlapping relationship so that elongated gas passageways are provided between the flanges 52 and the successive baffles 50 whereby to provide elongated gas passageways having a substantially L-shaped cross section. In the modification shown in Figs. 1 to 3 the flanges 52 are turned downwardly at their lowermost ends 55 and have elongated plates 56 welded or otherwise secured thereto. These plates 56 in cooperation with the flanges 52 form a tubular structure which serves to strengthen each of the flanges 52 and the entire tray structure. In addition the plates 56 restrict the gas flowing between the successive flanges 52 so that the velocity of gas flowed between the flanges is greater than that flowing between the less restrictive space between the successive baffle plates 50.

Otherwise stated, it will be noted that the tray comprises a plurality of spaced, parallel, substantially L-shaped baffle plates extending transversely between the liquid-receiving end and the liquid discharge end and having upwardly extending perforate upper sections 50 and imperforate lower sections 52. The passageways between the plates are also substantially L-shaped and are more restricted in their lower portions between the lower sections 52 than in their upper portions between the upper sections 50. The lower portions also have a uniform cross section throughout a substantial portion of their length whereby gases passing upwardly through the tray project liquid against and through the upper sections and appreciable downward flow of liquid through the lower portions of the passageways is prevented. Thus pressure drop across this type of tray is minimized.

It is preferred that the tray be made in several sections whereby it may be assembled directly within an existing tower. This is effected by the means particularly shown in Figs. 2 and 3. In this modification the requisite number of baffle plates and flange elements are secured between a pair of support plates 54 and 58. The plates 54 are planar while plates 58 are curved (see Fig. 3) to conform to the cylindrical side walls of the housing 20. Thus the baffle plates and flanges are secured between plates 54 and 58 (or between plates 54 and 54 as in the center section) thus forming individual units which may be assembled in the tower as indicated. These units may then be bolted together in side-by-side relationship as indicated in Fig. 2 and the entire assembly is welded to curved plates 60 which are bolted to an annular flange 62 secured to the inner side walls of the tower.

In the operation of the device described above vapors pass upwardly through each tray from one zone to another zone above. The flow of vapors must be directly through the elongated L-shaped gas passageways 55 in each tray since these passageways provide the only path, a liquid seal being provided in association with several downpours 44. As vapors are passing upwardly through an individual tray, liquid is flowed from the corresponding seal chamber over the weir 48 or through the perforations thereof into the space between the weir and the first baffle plate. Liquid flows down from the weir and is picked up by the gas streaming upwardly between the bottom of the sealing chamber and the adjacent flange 52 whereby the liquid is thrown against the first baffle plate. At this point most of the gases separate from the liquid, the liquid passes through the perforations of the first baffle plate and drops downwardly where it is again picked up by a second stream of gas passing between adjacent flanges 52 whereupon the resulting mixture is thrown against the second perforated baffle plate. This process is successively repeated until the liquid finally reaches the last baffle plate which is the one furthest to the right shown in Fig. 3. Thereafter the liquid drops downwardly through the downpour 44 into another seal chamber and the entire process is repeated on the tray next below. It will be noted that by this construction the flow of liquid across the interior of the tower is in one direction on one tray but is in a reverse direction on the tray immediately below. The curved plates 60 supporting the tray elements are provided with triangular plate-like extensions 64 welded or otherwise secured thereto and adjacent the upper section of the tray whereby to prevent liquid from spilling over the sides of the tray in the upper portion thereof.

It will thus be apparent that an apparatus has been provided which provides for the intimate contact of gases or vapors and liquids passing through the tower. The structure of the several trays is comparatively simple but permits large quantities of vapor to be intimately contacted with the liquid passing therethrough. It will be noted that the device is extremely efficient since all of the gas must pass upwardly through the tray and there is no chance for by-passing.

In the foregoing there has been described a tray which is somewhat inclined to the horizontal and in which the several flanges associated with the baffle plates are also inclined to the horizontal in spaced parallel planes. However, if desired, it will be apparent from a consideration of Fig. 4 that the flanges themselves may extend in a horizontal direction and in overlapping relationship thereby providing by virtue of this construction a narrow passageway for the gas between the successive flanges which widens considerably at the point between the successive baffle plates. A consideration of Fig. 5 discloses a construction in which the tray extends horizontally across the tower and in this instance the overlapping relationship of the several flanges is obtained by inclining them downwardly in overlapping relationship in the manner indicated. In connection with Figs. 4 and 5 it will of course be apparent that these showings are somewhat diagrammatic and the several elements of these trays may be supported in much the same manner as shown in connection with the tray of Fig. 3.

It will also be apparent from the foregoing description that the flange elements adjacent the baffle plates may assume a large variety of forms and shapes such as are indicated in Figs. 6 through 13. The selection of these will be dependent in a large measure upon the type of gas flow desired between the individual baffle plates in the tray. Likewise the arrangement and staggering of the various baffle plates will in some measure depend upon the specific shape of the several flange portions. While the baffle plates 50 have been shown extending in a vertical direction, it will be apparent that they may be bent or curved from the vertical wholly or in part. Thus the top edges may be bent as shown in Fig. 3 or in the opposite direction.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A gas-liquid contact tray having a liquid-receiving end and a liquid discharge end which comprises a plurality of spaced, parallel, substantially L-shaped baffle plates extending transversely of said tray between said ends and having upwardly extending perforate upper sections and imperforate lower sections extending toward said liquid-receiving end, said plates being arranged in overlapping relationship to form a plurality of substantially L-shaped passageways therebetween, the lower portions of said passageways between adjacent overlapping imperforate sections being more restrictive than the upper portions thereof between adjacent perforate sections, and said lower portions of successive passageways being arranged in substantially parallel spaced planes and each having a substantially uniform cross section for a substantial portion of its length whereby gas passing upwardly through said tray moves at a relatively high velocity through said lower portions toward said discharge end to project liquid against and through said upper sections thereby preventing appreciable downward flow of liquid through said lower portions.

2. The contact tray recited in claim 1 wherein the successive baffle plates are arranged in stepwise relationship descending in the direction of flow of liquid over the tray.

3. The contact tray recited in claim 2 wherein said lower sections lie in spaced horizontal planes.

4. The contact tray recited in claim 2 wherein said lower sections lie in spaced parallel planes inclined from the horizontal.

5. The contact tray recited in claim 1 wherein the upper side edges of the perforate sections of said plates lie in a common horizontal plane and wherein said lower sections lie in spaced parallel planes inclined from the horizontal.

References Cited in the file of this patent
UNITED STATES PATENTS

| Number | Name | Date |
| --- | --- | --- |
| 829,700 | Drees | Aug. 28, 1906 |
| 2,401,569 | Koch | June 4, 1946 |
| 2,510,590 | Kraft | June 6, 1950 |
| 2,591,343 | Eld | Apr. 1, 1952 |